United States Patent [19]

League et al.

[11] Patent Number: 5,668,739

[45] Date of Patent: *Sep. 16, 1997

[54] SYSTEM AND METHOD FOR TRACKING OBJECTS USING A DETECTION SYSTEM

[75] Inventors: Richard B. League; Norman Keith Lay, both of Peoria, Ill.

[73] Assignee: Caterpillar Inc., Peoria, Ill.

[*] Notice: The term of this patent shall not extend beyond the expiration date of Pat. No. 5,587,929.

[21] Appl. No.: 657,509

[22] Filed: Jun. 4, 1996

Related U.S. Application Data

[63] Continuation of Ser. No. 299,093, Sep. 2, 1994, Pat. No. 5,587,929.

[51] Int. Cl.⁶ .................................................. G01S 13/00
[52] U.S. Cl. ........................... 382/103; 342/118; 342/159
[58] Field of Search .............................. 364/516, 424.01, 364/424.07; 342/159, 196, 118; 382/103

[56] References Cited

U.S. PATENT DOCUMENTS

| | | | |
|---|---|---|---|
| 4,465,155 | 8/1984 | Collins | 180/169 |
| 4,623,966 | 11/1986 | O'Sullivan | 364/461 |
| 4,916,450 | 4/1990 | Davis | 342/71 |
| 4,937,878 | 6/1990 | Lo et al. | 382/1 |
| 5,170,352 | 12/1992 | McTamaney et al. | 364/424.02 |
| 5,280,288 | 1/1994 | Sherry et al. | 342/83 |
| 5,343,206 | 8/1994 | Ansaldi et al. | 342/70 |
| 5,374,932 | 12/1994 | Wyschogrod et al. | 342/36 |
| 5,418,536 | 5/1995 | Lisle et al. | 342/194 |
| 5,434,927 | 7/1995 | Brady et al. | 382/104 |
| 5,471,214 | 11/1995 | Faibish et al. | 342/70 |
| 5,483,455 | 1/1996 | Lay et al. | 364/448 |

FOREIGN PATENT DOCUMENTS

| | | |
|---|---|---|
| 0351654 | 1/1990 | European Pat. Off. . |
| 1510148 | 5/1978 | United Kingdom . |

OTHER PUBLICATIONS

Lakshmanan et al, "A Deformable Template Approach to Detecting Straight Edges in Radar Images", IEEE Transactions—pp. 1=28.

Primary Examiner—Emanuel T. Voeltz
Assistant Examiner—Patrick J. Assouad
Attorney, Agent, or Firm—Sterne, Kessler, Goldstein & Fox; James R. Yee

[57] ABSTRACT

A system and method of tracking objects first receives returns from objects in the field of view of a detector. The sensor generates a current frame of datapoints, where an object in the field of view can be represented by multiple datapoints. The datapoints are converted into global coordinates and mapped into a next frame of datapoints and generated at a next sample time to create a new current frame of datapoints. This new current frame of datapoints is processed to form a list of objects with location and power information that includes information from one or more previous frames. This mapping and processing to form the list of objects allows the system to detect weak signal targets in a ground cluttered environment and minimizes the occurrence of false alarms.

23 Claims, 8 Drawing Sheets

Fig_2_

Fig_3_

Fig_4_

Fig_5_

Fig_6_

Fig-7

Fig_8

SYSTEM AND METHOD FOR TRACKING OBJECTS USING A DETECTION SYSTEM

RELATED APPLICATION

This application is related to a commonly owned application entitled "Vehicle Position Determination System and Method," U.S. application Ser. No. 08/019/540, filed Feb. 18, 1993, the full disclosure of which is incorporated herein by reference as if reproduced in full below. This application is a continuation of U.S. application Ser. No. 08/299,093, now U.S. Pat. No. 5,587,929.

BACKGROUND OF THE INVENTION

1. Field of the Invention

The present invention relates generally to tracking systems, and more particularly to a method for tracking objects detected by a moving detector.

2. Related Art

Radar, lidar, sonar and other detection techniques are frequently used to detect objects without requiring visual contact. The application of such detection techniques has been expanded to include use in both passive and active collision avoidance systems. In such collision-avoidance applications, a detection system is used to detect objects in the path of a moving or mobile machine (referred to as a host or mobile machine). When an object is detected, appropriate steps are taken to avoid collision with the host vehicle. Such steps can include halting the host mobile machine, altering the host vehicle's path, or simply alerting an operator of the host mobile machine that there is a threat of collision.

One challenge for collision avoidance systems using conventional detection systems is that of minimizing false alarms. Depending on the system characteristics, threshold settings, and operating environment, conventional systems may be susceptible to false alarms. For example, in an environment having a high concentration of dust particles, such particles may appear as obstacles to a lidar (light detection and ranging) system.

A further challenge for collision avoidance systems is that of tracking an object while the host mobile machine is in motion. As the host vehicle moves along its route, an object detected by a detection system mounted on the host mobile machine may appear to move relative to the host mobile machine. For detectors that sense an instantaneous image at each sample time, the object may appear to jump from one position to the next. Such jumps may give rise to questions such as whether an object is really present, whether the signal return is just noise, whether there is more than one object, and so on.

SUMMARY OF THE INVENTION

The present invention is directed to a system and method for tracking objects detected using a detection system. According to the invention, the detection system is mounted on a host mobile machine. A sensor within the detection system scans across its field of view to produce a frame of datapoints. Each object detected by the detector results in several datapoints in each frame. Each datapoint represents a portion of a detected object. A group of adjacent datapoints, therefore, can represent a single object or a collection of adjacent, overlapping objects. Each datapoint includes an angle, range and power component, with respect to the detector at the sample time.

An adaptive thresholding method can be used to eliminate datapoints from a frame that are not of interest. After thresholding each datapoint is mapped from the frame of reference of the sensor into a global coordinate system. Thus, each object is mapped datapoint-by-datapoint into the global coordinate system. The global coordinate system preferably has a frame of reference that is stationary and independent of the sensor.

As time elapses, the sensor is again sampled at a second sample time to create a new frame of data. As with the previous frame, the datapoints in this new frame include an angle, range and power component with respect to the sensor at this second sample time.

The data from the first frame that was converted into global coordinates is now mapped into the new frame of datapoints. That is, the data in global coordinates are converted into coordinates in the sensor's frame of reference at the second sample time and added to the new frame. As a result, the new frame includes current data that was sampled at the second sample time, as well as data from the previous frame.

A search area centered around the route of the mobile machine can be defined as a subset of the entire field of view. To reduce processing time, the datapoint operations described above can be confined to only those datapoints falling within the search area.

This combined data (now in the second frame) is converted into global coordinates and mapped into the next frame of data. The process of converting the combined data from each frame and mapping the data into the next frame continues so that each new frame includes not only current object data, but also contains history data.

Before data from a previous frame are mapped into the next frame, the power value of each datapoint is attenuated by a scaling factor. This attenuation prevents the power value from an actual object from growing out of proportion. Such attenuation also ensures that noise returns, which appear in only one or two frames, are attenuated out of the system after several sample times.

The datapoints can be grouped into a list of objects in the field of view. This object list can be searched to determine if an object is in the path of the host mobile machine and at a range that requires the host vehicle to slow down, stop, or alter course.

One advantage of the invention is that noise data (e.g., an object that appears in only one frame) is attenuated and discarded. As a result, the system automatically rejects noise to prevent false detections.

Another advantage of the invention is that a stationary object appears in the same relative position of the sensor as the mobile machine moves, regardless of the mobile machine position (as long as the object is still in the field of view). In other words, the stationary object is mapped onto itself at each sample time. As an object is detected over several sample times, its power value continues to grow, indicating the legitimacy of the data. This is especially useful in detecting objects that have low power values.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE EMBODIMENTS

1. Overview and Discussion of the Invention

The present invention is a tracking technique for use with a detection system. The detection system, such as radar, lidar, sonar, or other detection system, can be mounted on a host mobile machine. The detection system is used to detect objects in the path of, or in the general vicinity of the host mobile machine. Such an application is useful in implementing collision avoidance techniques.

2. Example Environment

Figure 1:
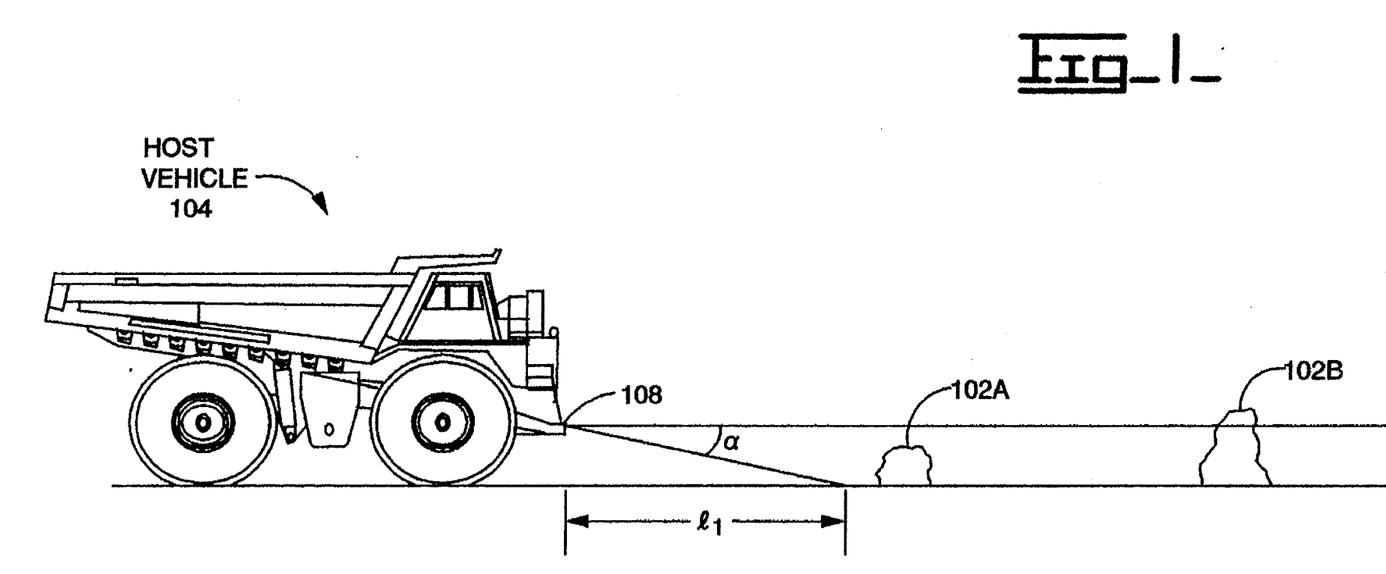
FIG. 1 is a diagram illustrating a detection system mounted on a host mobile machine.

For ease of discussion, the invention is discussed in terms of an example application as illustrated in FIG. 1. In this example application, the host mobile machine 104 is a mining truck, and the detection system 108 is a forward-looking radar system mounted on host mobile machine 104 to detect objects 102, such as rocks, in the host mobile machine's path.

Although the invention is discussed in terms of this example application, after reading the following description, it will become apparent to one skilled in the relevant art how the invention could be implemented in alternative environments with alternative detection and navigation systems. Other applications can include, but are not limited to, collision avoidance and/or navigation systems for aircraft, automobiles, locomotives, and other means of conveyance.

According to the example application, host mobile machine 104 is an autonomous mining truck that, during normal operations, is not driven by a human operator. Instead, host mobile machine 104 is operated by a computer system along a defined route. The radar detection system 108 is used to sense objects 102 in the host mobile machine's path.

The characteristics of the specific detection system chosen depend on the application. For collision avoidance and/or navigation systems for a relatively slow moving mobile machine (such as an automobile or a mining truck), the system is most concerned about objects that are near the mobile machine (e.g., within 300 meters). For high speed applications such as jet aircraft collision avoidance systems, early warning is required and therefore, the longer distances are important.

In the example environment of the autonomous mining system, only the area close to the mobile machine is important. In one embodiment, the sensor 204 (illustrated in FIG. 2) of detection system 108 is mounted approximately six feet above the ground. Sensor 204 looks downward to detect objects such as rocks in the host mobile machine's path. The bottom of the sensor beam intersects the ground at a distance $l_1$, which in one embodiment is approximately fifteen meters. The top of the sensor beam is approximately one degree above the horizon. (See FIG. 1.) The range of interest in this embodiment is 100 m. The angle α is the vertical field of view and is 8 degrees in this embodiment.

Figure 2:
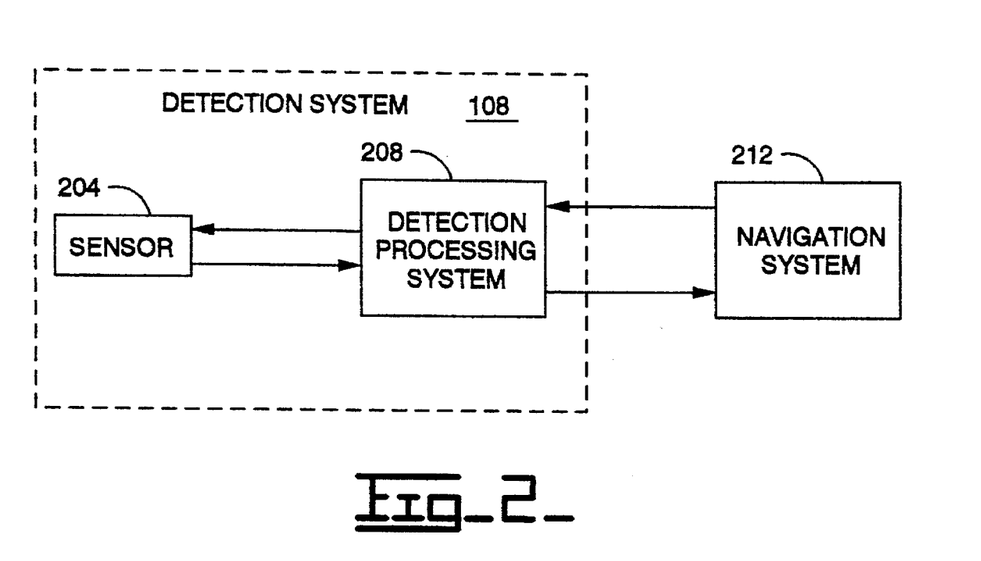
FIG. 2 is a block diagram illustrating a detection system.

FIG. 2 is a block diagram illustrating the detection system 108 and a navigation system 212. Detection system 108 includes a sensor 204 and a detection processing system 208. In this example, sensor 204 is a radar sensor that senses the presence of objects 102 within its field of view. In one embodiment, sensor 204 can be a forward-looking sensor to detect objects only in front of host mobile machine 104. In an alternative embodiment, sensor 204 can be used to sense objects in any desired direction and can provide up to 360 degrees of coverage.

In some simplified detection systems, the size of the object can be ignored and all that is measured is the presence of an object 102, its distance, and the rate at which it is moving with respect to the mobile machine. Such a simplified system, similar to those proposed for some simple intelligent vehicle highway applications, receives a single return for an object in the path of the mobile machine, and responds if the object is dangerously close or closing rapidly. The system is not concerned with the size or type of object detected, but is only concerned with whether there is some object in the mobile machine's path.

In the example implementation, more specific action may need to be taken. For example, because there is no driver, the width of the object 102 needs to be known so that host mobile machine 104 can be steered around the object 102 if necessary.

Additionally, it is important to know whether there are objects 102 such as rocks in the path of host mobile machine 104. Rocks may be difficult to detect. For example, consider a relatively small rock in the near field, such as the object 102A depicted in FIG. 1. Detection system 108 will detect returns from object 102A as well as returns from the road in front of and behind object 102A. Therefore, it may be difficult to distinguish the presence of object 102A from the background noise (i.e., returns from the road).

Because of these specific requirements of this example implementation, detection system 108 is implemented as a millimeter wave radar system. Such a system provides high resolution tracking with a very narrow beam-width. As a result, during a scan across the field of view, several adjacent returns may be received for each object 102 in host mobile machine's 104 path. Thus, each individual object may be represented by several datapoints each in its own bin.

Sensor 204 scans across its field of view and creates an electronic signal that represents the scene sensed. This representation is referred to as a frame 216. At the end of each scan, a frame 216 of data is completed and sent to detection processing system 208. In one embodiment, scan data is sent one word at a time, with 512 values representing the data for one antenna position. Timing, word counting, and/or synchronization mechanisms are used to track the frames.

Detection processing system 208 receives each frame 216. Detection processing system 208 examines each frame 216 to facilitate determination of whether a detected object 102 is a real object or noise, and whether a course correction is required to avoid the object 102.

It is useful to track objects 102 sensed by detection system 108 for several reasons. First, detection systems 108 some-times trigger on noise and, as a result, render false signals. For example, this may occur where a flash of light is reflected off a distant object and is sensed by a lidar detection system. Such noise signals usually appear in only a single detector frame 216. To unnecessarily stop or re-route host vehicle 104 because of a noise signal would result in operational inefficiencies.

Another reason to track objects 102 is to determine the distance from host mobile machine 104 to the detected object 102. Such a determination allows an operator or automated navigation system to determine whether corrective action is required and to further determine the severity of such corrective action. For example, a large object 102 appearing a short distance in front of the mining truck may require that the truck be halted immediately or that drastic course alterations be implemented.

As the above reasons highlight, it is important to track objects 102 sensed by the detection system 108. However, there are difficulties associated with such tracking. One key difficulty is that as host mobile machine 104 moves along a path, an object 102 appears to move relative to host mobile machine 104, even if that object 102 is stationary. Thus, an object 102 appearing at a first location in a first frame 216 may appear as a second object 102 at a second location in a subsequent frame 216. This phenomenon my lead to the erroneous conclusion that there are multiple objects 102 to avoid, one at each location. This phenomenon may also lead to the erroneous conclusion that the object sensed is just noise because it only appeared at a given location for one frame 216.

3. Object Tracking

Object tracking is now described in terms of the example application introduced above.

3.1 Tracking Introduction

In general, objects are tracked as follows. Each Object 102 detected by sensor 204 is represented in a first frame 216 as several datapoints. Each datapoint indicates a power value at a given angle and range. This representation, referred to as a frame of datapoints, indicates the position of objects 102 relative to sensor 204.

In the example embodiment using a radar sensor 204, when an object 102 is detected by sensor 204, the returns are given in terms of time and amplitude. This data must be converted into range and power data at each horizontal scan angle. In the example embodiment this is done by performing a fast-fourier transform (FFT) on the data at each horizontal scan angle.

After the data is received, the FFT is done, the data is stored in frame 216, and each datapoint is converted into global coordinates so that object position is known independent of detector position. Global coordinates may be referenced to a fixed location on the ground, such as, for example, an operations headquarters. Thus, a stationary object 102 remains fixed within the global coordinates frame of reference, regardless of where host mobile machine 104 (and hence sensor 204 is positioned).

As host mobile machine 104 continues to move along its path, objects 102 are detected and represented by datapoints in a second frame 216 at a second sample time. The frame data in global coordinates (from the previous frame) are converted to angle and range coordinates relative to detector position 204 when the second frame 216 is detected. These data are then combined with the frame data in the second frame 216.

The combined datapoints in the second frame 216 are then converted to global coordinates and mapped into the next (third) frame 216. This process continues so that datapoints from all previous frames 216 are mapped into and combined with each subsequent frame 216.

As a result of this mapping, a datapoint that appeared in the first frame appears coincident with itself in the second and subsequent frames 216, even when host mobile machine 104 is moving (i.e., even when sensor 204 is moving with respect to the object 102). This is because data from one frame 216 are converted into global coordinates, then re-converted into the frame of reference of sensor 204 at its next sample time, then mapped into the new frame 216.

3.2 Frame Generation

To better illustrate mapping, it is helpful to understand creation of a frame 216 in greater detail. Detection system 108, and generation of frames 216 are now described in detail in terms of an example detection system chosen to implement object tracking in the example environment.

Figure 3:
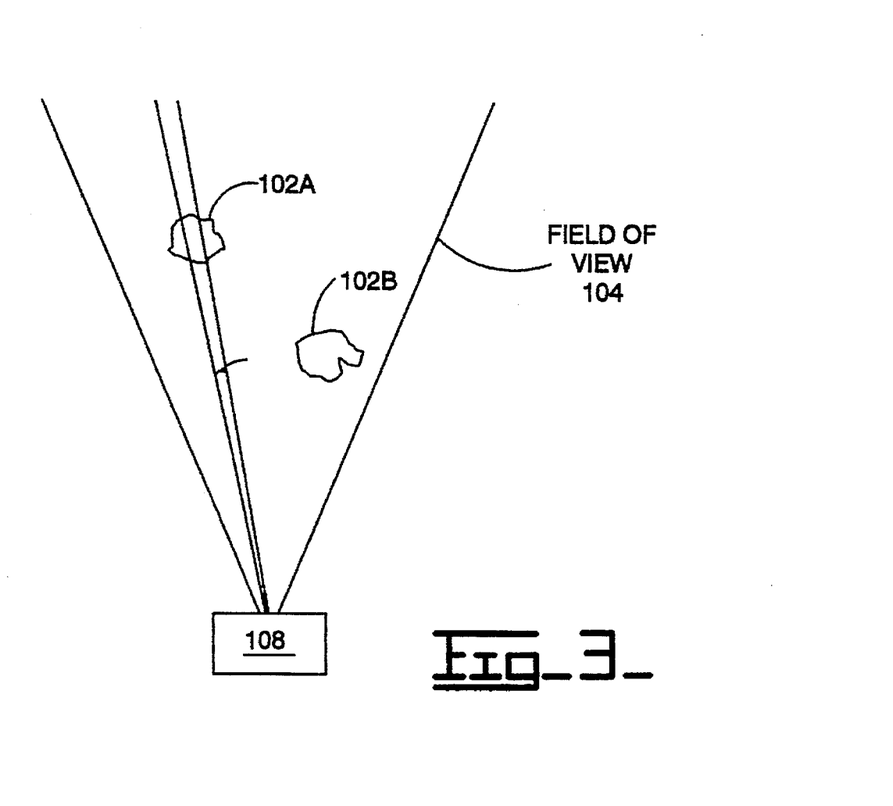
FIG. 3 is a diagram illustrating a detector and its associated field of view.
Figure 4:
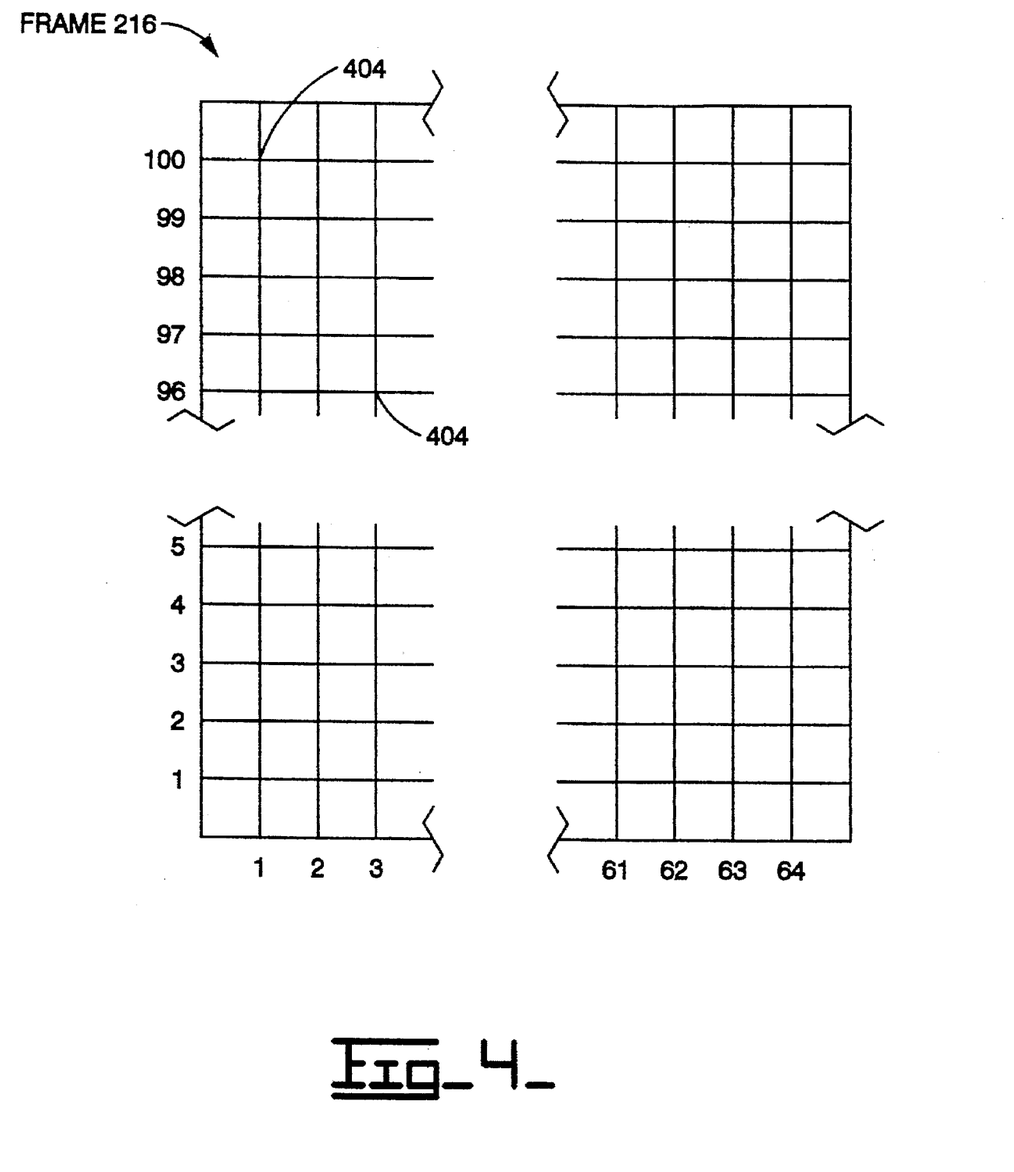
FIG. 4 is a diagram illustrating a frame of datapoints from a detector.

FIG. 3 illustrates objects 102 in a field of view of a sensor 204. FIG. 4 illustrates a representation of a frame 216. An inherent characteristic of detection system 108 is a field of view 304. The field of view 304 is defined by the limits of the horizontal scanning of sensor 204.

According to this example, sensor 204 is a frequency modulated continuous wave (FMCW) millimeter-wave radar unit operating at a frequency of 77 GHz. Sensor 204 scans a one degree beam (illustrated as theta in FIG. 3) across a sixty-four degree horizontal field of view 304 at one degree intervals. RF energy centered at approximately 77 GHz is transmitted in an upramp portion and a downramp portion. The received signal is mixed with this transmitted signal and an intermediate frequency (IF) signal results. When radar energy is reflected off objects in the radar's field of view, the range of these objects is directly proportional to frequencies in the IF signal.

An anti-aliasing filter is used to eliminate frequencies above 500 KHz in the IF signal. The cutoff frequency of the anti-aliasing filter is 390 KHz which corresponds to a range of 100 meters. The IF signal is also run through a R^4 filter which eliminates the effect of the fallout of radar power as the radius from the source increases. This means that an object will have approximately the same power at 100 meters as it does at 5 meters.

The portion of the IF signal that corresponds to the upramp time and the downramp time are digitized and sent to detection processing system 208. each upramp portion and downramp portion of the signal is digitized into 256 words or time increments. Frame 216 is created by detection processing system 208 by performing a fast fourier transform (FFT) on the downramp portion of the data at each one degree interval. The FFT transforms the 256 points of digital data into the power domain resulting in 128 values that correspond to reflected power values at 1 meter increments up to 128 meters from sensor 204. Since the cutoff frequency of the anti-aliasing filter is at 390 KHz, the values beyond 100 meters are ignored and frame 216 is created with 64 azimuth positions and power values out of 100 meters.

An additional step that could be performed at this stage is to perform an FFT on the upramp portion and use the information on the object shift in the upramp and downramp portion to calculate the relative speed of the objects in the field of view 304. In the present invention this step is not being done because of limited processing power available on the example hardware, but it is recognized that this step could add relative speed information. This step is also not being done because at this stage a single object 102 in frame 216 may be represented by several datapoints (power values in frame 216. Frame rates of 4 to 5 Hz on frame 216 enable the objects 102 to be viewed several times per second have reduced the need for relative speed information in the present application where the host mobile machine's top speed is 35 miles per hour. Viewing the objects 102 in multiple beams and at frame rates of 4–5 Hz is more advantageous for finding smaller power objects than taking the time to calculate the relative speed of the objects.

Data in frame 216 indicate the location of objects 102 relative to the position of sensor 204 at approximately the time the return is received. This time can be approximated as being roughly equal to the time at which the scan is completed. Thus, the term "sample time" as it is used in this document can refer to the end of a sweep, the time at which a return is received by sensor 204, or some other time relating to the receipt of a signal return.

In FIG. 3, two objects 102A, 102B are within field of view 304 of detection system 108.

Referring now to FIG. 4, each frame 216 is partitioned into a plurality of bins 404. The bins are used to represent the location of datapoints representing signal returns from objects 102 within field of view 304. In one embodiment, the field of view is divided into one degree increments in the theta (Θ) direction and one meter increments in the forward, or leading, direction. Thus, for a field of view having a sweep of 64° and a depth of 100 meters, the field of view is divided into 6400 increments. To accommodate this, frame 216 can be logically defined as having 6400 bins 404. Each bin 404 is illustrated as a grid point in FIG. 4 where the ordinate defines the sweep angle and the abscissa defines the depth. For each datapoint returned for a detected object, a value representing the signal power will be placed in a bin 404 associated with the position of that portion of the object (in sweep angle and depth) within the field of view 304.

3.3 Object Tracking

The above discussion describes how datapoints that represent each object 102 are represented in a frame 216. What is now described is how the objects 102 are tracked from one frame 216 to another frame 216 as host mobile machines 104 moves along its path. As stated above, this is important because as host mobile machine 104 moves, the location of a stationary object 102 with respect to sensor 204 will change. This discussion is provided in terms of a single object 102A for simplicity. After reading the following discussion, it would become apparent to a person skilled in the relevant art how this technique is applied to a plurality of objects.

It is helpful to first summarize object tracking before describing the process in detail. Simply put, the goal in object tracking is to map each sensed object 102 into global coordinates so the object can be represented independent of sensor position. The mapped object 102 is then re-mapped into a subsequent frame of data. That is, its position (now known in global coordinates) is mapped into the coordinates of sensor 204 at the time the subsequent frame of data is taken. As a result, a stationary object 102 is mapped onto itself for each subsequent frame in which it appears.

In some conventional tracking systems, objects 102 being tracked are at very long distances from the radar. An object's range can be anywhere from a few kilometers to several hundred kilometers. As a result, each object appears as a single datapoint in a single bin. Such objects 102 could be easily tracked by mapping the single datapoint associated with each object onto the next frame of data.

By contrast, in the example implementation, as well as in some other applications, objects are detected near the vehicle. Because the example application is concerned with avoiding objects relatively close to the mobile machines (e.g., at a range of 100 meters or closer), objects appear in a frame 216 as several datapoints. As described below, this presents several unique problems which must be overcome when mapping objects from one frame to the next.

In practice, the accuracy of radar is constrained by environmental effects, target characteristics, and instrumentation error. Environmental effects can include multi-path signal propagation and refraction. Target characteristics can include target surface texture that results in individual scattering centers, and rounded edges which result in non-uniform returns around the edges of the target. Instrumentation error, which can be minimized with proper alignment and calibration techniques, constrains performance as well. Additionally, parallax error may result in this application where sensor 204 is mounted above the ground and used to track objects 102 on the ground.

Because these effects can result in object images that appear to wander and glimmer, it is difficult to map an object 102 from one frame to the next. The inventors have conceived of a solution to overcome this problem. According to the inventors' solution, objects 102 are not mapped per se as objects. Instead, the inventors' solution individually maps each datapoint to the subsequent frame. As a result, each datapoint of an object 102 in one frame is mapped into the subsequent frame.

A step, referred to as blob coloring, is then performed to group the combined datapoints into sets that represent objects 102.

Figure 5:
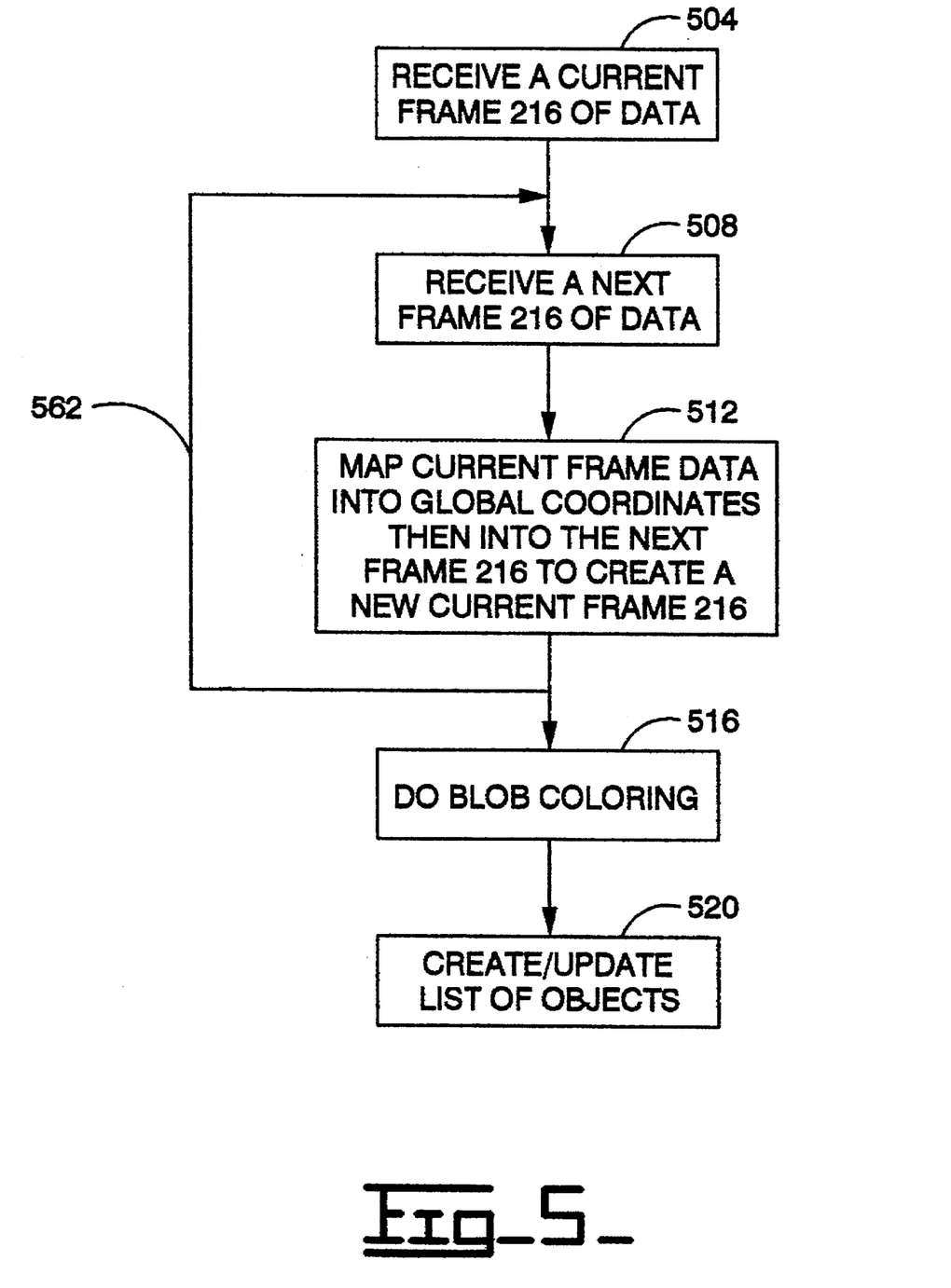
FIG. 5 is a flow diagram illustrating tracking of objects detected by a detector.

FIG. 5 is an operational flow diagram illustrating the tracking of objects among a series of frames 216. In a step 504, tracking system 212 receives a current frame 216 of data. Current frame 216 includes a representation of each object 102 detected in field of view 304. As stated above, in the example environment, each object is typically represented by several datapoints.

As stated above, the signal stored in each bin represents the range, angle, and power of the return signal. The power portion represents the signal strength received from the detected objects 102. This signal strength, or power, can be an indication of the size, shape, and/or composition of object 102. The power also relates to the number of frames in which an object 102 has appeared.

Host mobile machine 104 continues to move along its path. During this time, detection system 108 is making a next scan to detect objects 102 within field of view 304. At the end of the scan, detection processing system 208 has received a complete frame 216 of datapoints. Thus, in a step 512, detection processing system 208 receives a next frame 216 of data. Because host mobile machine 104 has moved since the last frame 216 was received in step 504, it is likely that in this new frame 216 object 102A is represented by a different set of datapoints in different bins 404 than it was in the old frame 216.

Therefore, in a step 516, the datapoints received in step 504 are mapped first into global coordinates and then mapped into this next frame 216 received in step 512. This creates a new current frame 216 containing data received in step 512 as well as data from the previous frame 216 received in step 504. Because the datapoints from previous frame 216 are first mapped to global coordinates and because the position of detection system 108 in global coordinates is known at the time the next frame 216 was generated, the datapoints from previous frame 216 can be mapped into the next frame 216 at the correct range and angle position (i.e., in the correct bin 404). To accomplish this, the datapoints are convened to global coordinates and then mapped to the coordinate system of the detection system 108 (i.e., local coordinates) and translated to reflect the position of detection system 108 at the time that next frame 216 was generated.

In this step, each datapoint is individually mapped into global coordinates without regard to which object it represents. In other words, according to the invention, "objects" per se are not mapped. Instead, individual datapoints are mapped. According to one embodiment, each datapoint is mapped into global coordinates and then immediately mapped into new local coordinates. Therefore, in this embodiment, only one datapoint is ever in global coordinates, and then, for only a very brief period of time. The algorithm takes advantage of the implicit coordinate system of the frame's array structure itself. That is, row indices are azimuths and column indices are distances. A similar army encompassing the site traversed by the host would be enormous. Therefore, in the preferred embodiment, each point in the current frame is mapped into global coordinates (Northing and Easting), which are then used to compute an azimuth index and a distance index in the new frame. These indices point to where the (attenuated) power value from the current frame will be summed with the power value of the next frame. Thus, storage for only one Northing and Easting pair is required because it is reused for each datapoint.

An alternative embodiment calls for interpolating the power value from the current frame into four points in the next frame since the mapping of global coordinates into array indices is inexact. The mapped point always (except at the edges) lies within a region bounded by four points in the next frame. The preferred embodiment does not interpolate, but rather maps the power value from the current frame to the nearest point in the next frame. The alternative embodiment would cause a diffusion effect at the edges of objects, requiring an additional thresholding process.

In one embodiment, the global coordinate system is defined using a frame of reference that is at a fixed location. For example, the frame of reference of the global coordinate system could be centered at a fixed base station or at an operations headquarters. With such a stationary frame of reference, a stationary object 102 is always located at the same coordinates. This is in contrast to the frame of reference of detection system 108 which moves as host mobile machine 104 moves. With a moving frame of reference, a stationary object 102 appears at different coordinates as the frame of reference moves relative to the stationary object 102.

Thus, step 516 translates the datapoints, measured from the frame of reference of detection system 108, to a global coordinate system that is not dependent on the position of host mobile machine 104. To accomplish this conversion, it is first necessary to know the position of detection system 108 in global coordinates at the sample time. In the example embodiment, the position of host mobile machine 104 in global coordinates can be determined using, for example, a GPS (global positioning system) receiver. Once the position of host mobile machine 104 is known, a simple translation can be made to determine the position of detection system 108 in global coordinates.

Once the position of detection system 108 is known, the angle/depth coordinates provided by detection system 108 are translated to account for the position of detection system 108 in global coordinates. As a result, each datapoint is briefly represented in global coordinates, which are true coordinates referenced to the base station and independent of the position of host mobile machine 104 and detection system 108. The mechanics of coordinate mapping are well known to those skilled in the relevant art.

In a step 520, a step called blob coloring is performed based on the data contained in the new current frame 216. In this step, each datapoint is combined with adjacent datapoints to define one or more objects from the collection of mapped datapoints. This step is defined in more detail below.

In a step 524, a list of objects 102 is created based on the results of blob coloring. This fist includes the angle, range, and power of each object contained in the new current frame 216.

As illustrated by flowline 562, another frame 216 of data is received (step 512), and the current data is mapped into global coordinates and then remapped the most recent frame 216 to create another new current frame 216 (step 516). Blob coloring is again performed in step 520 and the list of objects is updated. This process continues to repeat and, as it does, the list of objects continues to be updated.

Figure 6:
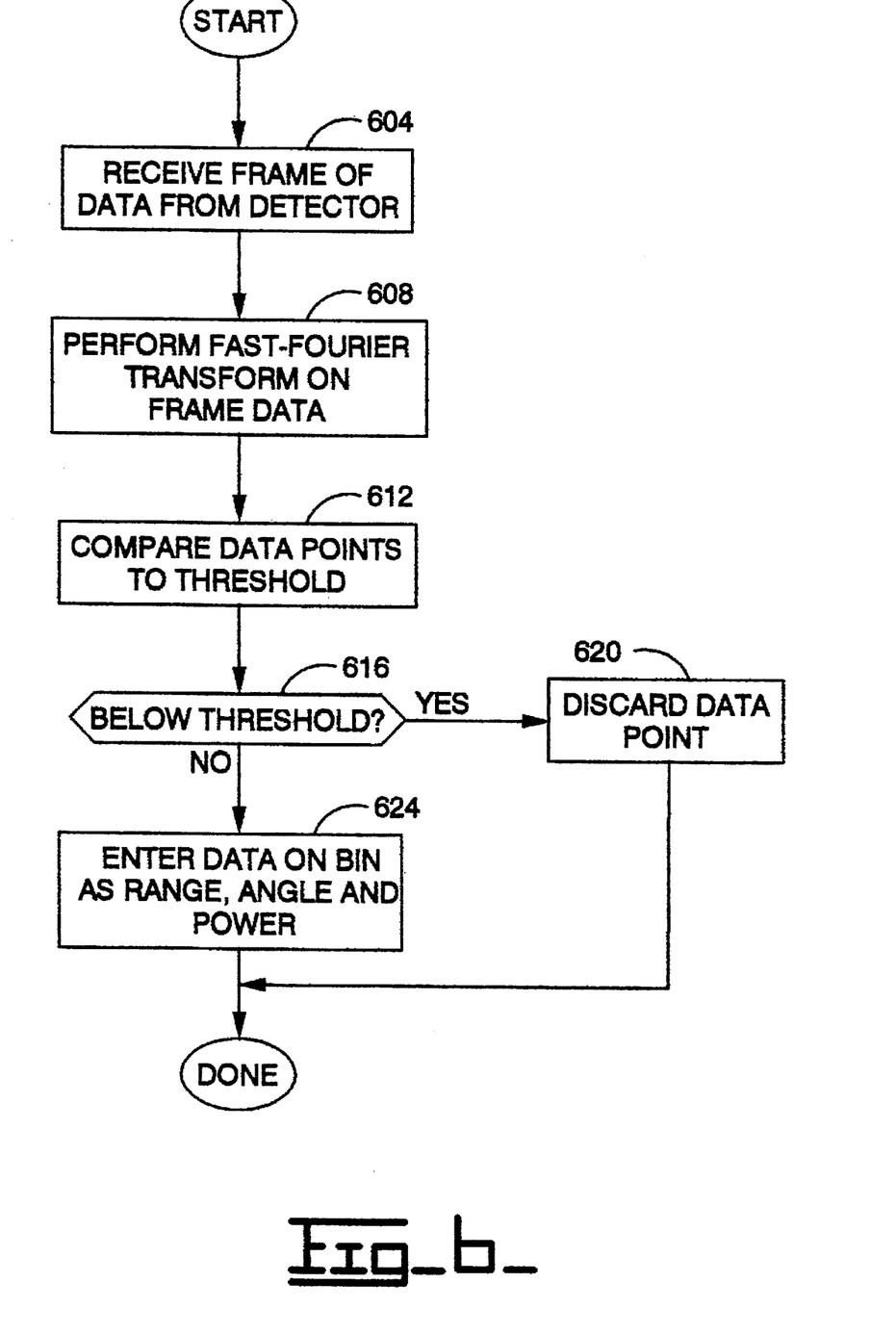
FIG. 6 is a flow diagram illustrating a transformation of data detected by a detector.

FIG. 6 is an operational flow diagram illustrating step 504 in greater detail. Referring now to FIG. 6, in a step 604, a frame 216 of data is received from sensor 204. This frame 216 is in a time domain where each object is represented by time and amplitude values. In a step 608, tracking system 212 performs a fast-fourier transform on this data to get a range, angle, and power for each datapoint.

In a step 612, each datapoint is compared to a threshold level to determine whether the datapoint is valid. If below threshold (decision block 616), the data is discarded in a step 620. If above threshold, the datapoint is entered in a step 624.

In one embodiment, the threshold is determined using a constant false alarm rate (CFAR) algorithm. This algorithm provides a means for determining a threshold for each range bin 404 by comparing the value of a range bin 404 to the mean of its neighbors, or some grouping of its neighbors. See pages 392–395 in "Introduction to Radar Systems" by Merrill I. Skolnik, McGraw-Hill, Inc., copyright 1980, for a description of a CFAR radar receiver.

Figure 7:
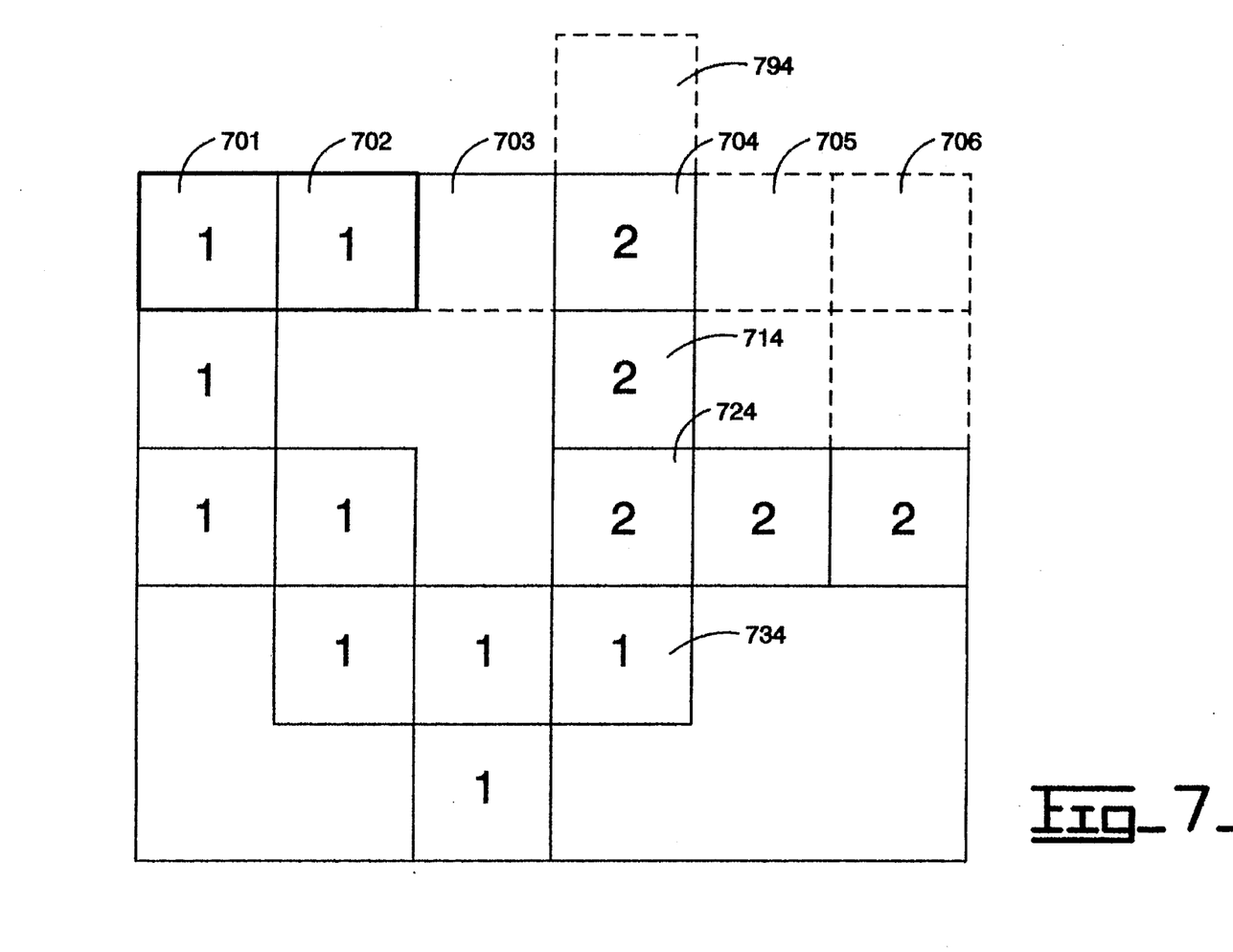
FIG. 7 is a diagram illustrating a representative scenario for blob coloring.
Figure 8:
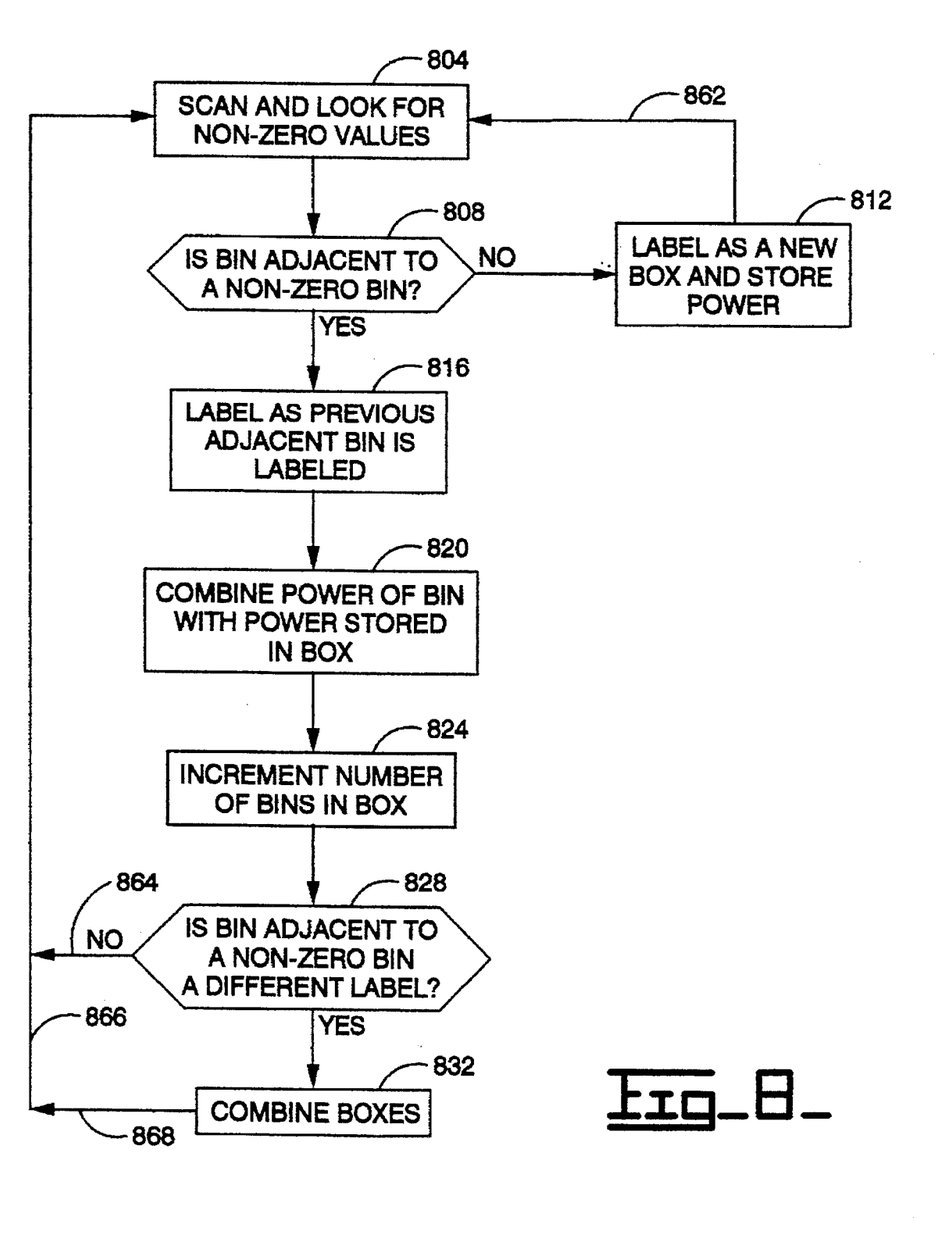
FIG. 8 is an operational flow diagram illustrating the process of blob coloring according to one embodiment.

In a preferred embodiment, each datapoint is compared to the mean of the datapoints in the five range bins 404 in front of the datapoint and the five range bins behind the datapoint and to the same range bins 404 in the radar beams to the left and the fight of the datapoint. In this way a window around the datapoint with the dimensions of three beams in azimuth by 11 in range increments is formed. The mean of the 32 datapoints around the datapoint is found and if the point is greater than 3 times this mean then the point is above the threshold and the point is considered valid otherwise the value of the range bin is reduced to zero. Various other criteria with regard to the neighbors around the datapoint could be used to determine the threshold. 3.4 Blob Coloring As stated above the step 520 of blob coloring is performed to determine which datapoints can be combined to indicate the presence of an object. Blob coloring is a technique used in the computer vision field to label objects in a computer image. A blob coloring algorithm is given on page 151 of "Computer Vision," Ballard and Brown, Prentice-Hall, Inc., 1982. This step is now described in greater detail. FIG. 7 is a diagram illustrating a representative scenario for blob coloring. FIG. 8 is an operational flow diagram illustrating the process of blob coloring according to one embodiment.

FIG. 7 illustrates a portion of a frame 216. Because blob coloring is performed after frame 216 is combined with datapoints from previous frames 216 (i.e., steps 504–516), the portion of frame 216 illustrated in FIG. 7 is a portion of a frame of combined datapoints. Each bin 701,702,703, et seq. contains a power value. For bins for which there were no datapoints, the power value is zero. For bins in which there was a return in one or more previous frames and/or in the current frame, there is a power value. The power value is the power value from the current (i.e., most recent) frame 216 summed with the attenuated power value mapped from one or more previous frames.

In a step 804, the frame 216 is scanned to look for bins 701,702,703, et seq. in which there are non-zero power values. In the example illustrated in FIG. 7, the first bin encountered with a non-zero power value in the portion of frame 216 illustrated is bin 701.

When a bin with a non-zero value is encountered, previously scanned adjacent bins are checked to determine whether the bin just encountered is adjacent to a bin having a power value. This is illustrated by step 808. Because bin 701 is the first bin encountered with a non-zero value (bin 702 has not been checked yet), the answer to this query is no and the operation continues at a step 812.

In step 812, the encountered bin is labeled as a new "box" and the power value contained in that bin is stored in a table under that label. In the example illustrated in FIG. 7, bin 701 is labeled as box 1 and its power value stored in a table under box 1.

A second example of steps 804, 808 and 812 is illustrated by examining bin 704. When bin 704 is encountered as having a non-zero value, adjacent bin 703 is checked in step 808 (if we are not in the top row of frame 216, the bin 794 above bin 704 is checked as well). Because there are no adjacent, previously checked bins with non-zero powers, bin 704 is labeled as a new box, box 2, its power is stored in box 2, and a counter for box 2 is set to indicate that there is one bin in box 2.

Per flow line 862, the scanning operation continues at step 804 until the next bin having a non-zero value is encountered. If a bin is encountered that has a non-zero power value and this bin is adjacent to a previously scanned bin also having a non-zero power the operation continues at a step 816.

In step 816, the new bin is labeled with the same label provided to the adjacent bin, its power is combined with the power value stored for that box (step 820) and a counter indicating the number of bins in the box is incremented by one (step 824). The box, which includes one or more datapoints, can be referred to as a "blob." Several examples of this are illustrated in FIG. 7.

In a first example, consider bin 702. Bin 702 has a non-zero value and is adjacent to bin 701, which belongs to box 1. In steps 816 to 824, bin 702 is labeled as belonging to box 1, its power value is added to the value of box 1, and box 1's bin counter is incremented. At this time, box 1 can be visualized as a bounding box surrounding bins 701 and 702 as illustrated by the bold-faced box around these bins.

A second example of steps 816–824 is illustrated at bin 714. This bin has a non-zero value and is adjacent to bin 704. In steps 816 to 824, bin 714 is labeled as belonging to box 2, its power value is added to the value of box 2, and box 2's bin counter is incremented.

Continuing at step 828, when a bin is encountered and labeled as belonging to the box associated with one adjacent bin, the other adjacent bin is checked to see if it is also non-zero and labeled as well. If the label of the second adjacent bin is different (i.e., if it is labeled as belonging to a different box), the boxes are combined in a step 832 by adding the power values and bin counters for both boxes.

An example of steps 828 and 832 is illustrated at bin 734. During steps 808 to 824, bin 734 is labeled as belonging to box 1 and combined with box 1. When bin 734 is compared to bin 724, the power values for box 1 are combined with the power value for box 2 and the bin counters are combined. The bounding box can then be described as encompassing all bins labeled as boxes 1 and boxes 2. In effect, blob 1 and blob 2 are melted together. As a result, the combined blobs 1 and 2 represent one object.

In one embodiment of this invention, additional information is stored as the initial pass over the frame of datapoints 216 is done. This eliminates the need for an additional or a partial pass over the datapoints when combining blobs and finding their locations. The algorithm in Ballard and Brown mentioned above required additional passes. As stated above, the representation of the blobs is kept as a bounding box and when two blobs need to be combined then the bounding box dimensions of the first blob are expanded to encompass the dimensions of the second blob. This eliminates the need to perform an additional pass or partial pass over the data to combine blobs.

In one embodiment of blob coloring the label (described as a 1 or 2 in the above description) that is used for an object is used as the actual software pointer (computer memory position of the information) to a structure of information about the blob. This information can include the near right range and azimuth of the blob, the far left range and azimuth of the blob, the centroid, the sum of the power of the datapoints in the blob, the number of points in the blob, and the maximum power of a datapoint in the blob. By using this technique, the list of blobs and their relevant information is completed. This list of blob pointers is searched to determine when to slow down or stop the vehicle.

Because the frames 216 are mapped one datapoint at a time, this step of blob coloring is essential to combine the datapoints into one or more objects 102.

Due to the non-uniformity of the objects (rounded edges, scatter points, etc.) and the difficulty associated with thresholding a small object like a rock lying on a road with the same consistency, some or all of the datapoints representing an object (especially at the edges) may not appear in each frame. As a result, the object appears to change size and shape with each frame and may even disappear from some frames. This makes it extremely difficult to map an object 102 onto itself in the next frame.

However, because mapping according to the invention is performed one datapoint at a time and blob coloring is performed on the cumulative frame, these effects do not pose serious difficulties to object tracking. The summing of powers into subsequent frames allows the returns to be in a sense averaged over time, thus minimizing the effects of non-steady returns over time.

4.0 Detection System 108

As stated above, detection system 108 can be implemented using a number of different detection techniques and a number of different system architectures or designs. An example implementation of detection system 108 is described.

Figure 9:
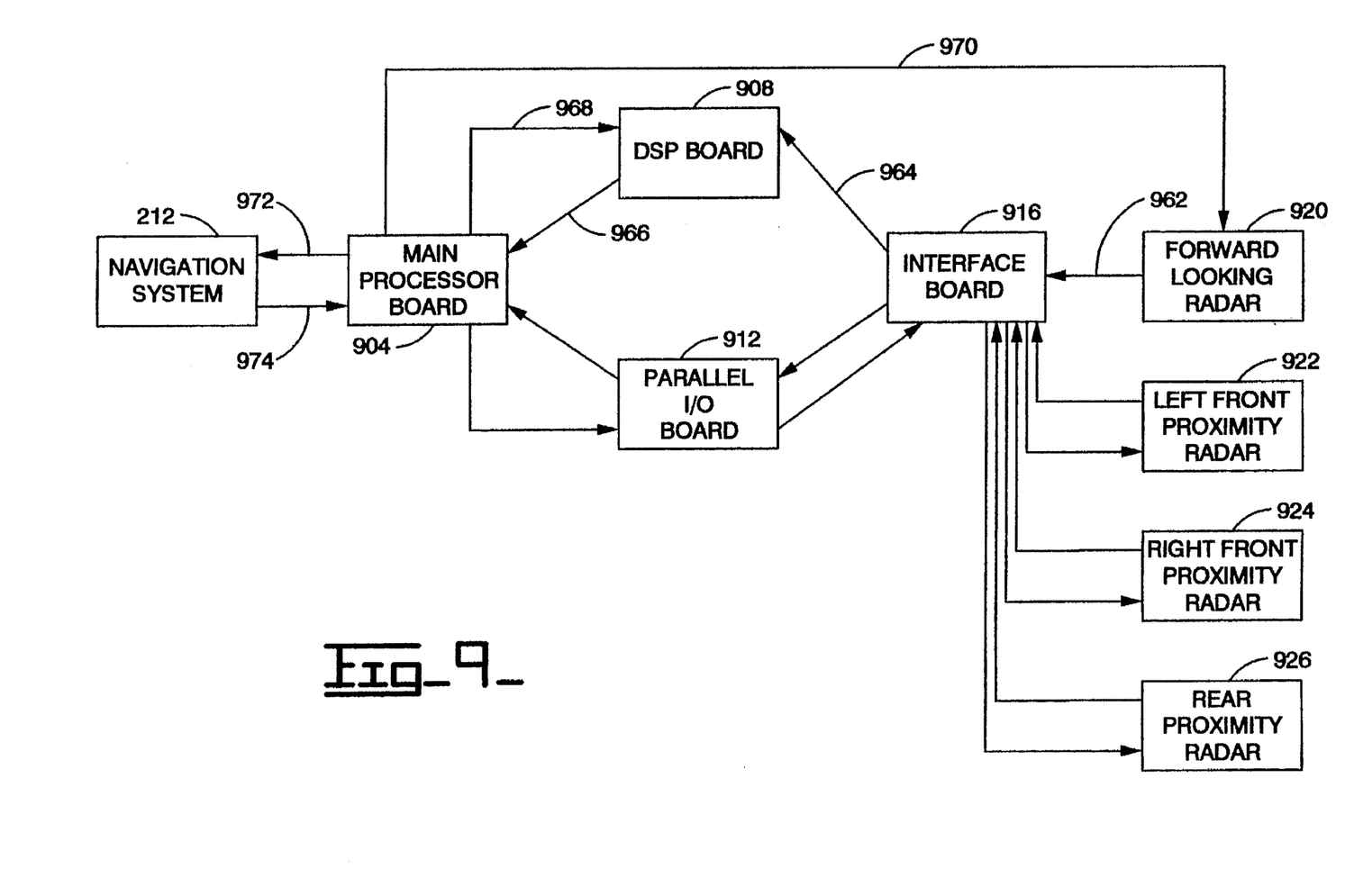
FIG. 9 is a block diagram illustrating an example detection system and navigation system.

FIG. 9 is a block diagram illustrating an example implementation of detection system 108 interfaced to navigation system 212. Detection system 108 in this example embodiment includes a main processor 904, a DSP (digital signal processor) 908, and interfaces 916 to the actual detection unit in this case radar 920.

Additional proximity radar units 922, 924, 926 can be provided to trigger proximity alarms. If proximity radar units 922, 924, 926 are provided, parallel I/O 912 may be required to interface the alarms to processor 904.

Interfaces 916 receive datapoints in frame 216 via signal path 962. Frame 262 datapoints are in the amplitude vs. time format. Interface 916 forwards this data to DSP 908 via signal path 964. In DSP 908, the datapoints are converted to the power vs. range format and are thresholded via a CFAR (constant false alarm rate) algorithm. DSP 908 forwards this converted thresholded frame to main processor 904 via signal path 966.

Main processor 904 provides threshold setting requirements and system resolution information to DSP 908 via signal path 968. Main processor 904 also generates and sends commands for frame rate, resolution, and start/stop scanning to radar 920 via signal path 970.

Main processor 904 provides object information and speed information to navigation system 212 via signal path 972. Navigation system 212 provides route and position information to DSP 904 via signal path 974.

Other Features

According to one embodiment, a double buffer system is used for frames 216. In this embodiment, when the first frame of data is received, it is stored in a first buffer while the second frame of data received is stored in a second buffer. After the data from the first frame 216 is converted into global coordinates and mapped into a second frame 216 in the second buffer, the first buffer can be cleared. This first buffer is now available for a next frame 216. This operation continues so that storing of each new frame 216 is alternated between buffers.

According to the method described, if an object 102 is a real object (as opposed to a return attributable to noise), many of its datapoints may appear in each new frame 216 as long as it is in the field of view 304. As described above, for each frame 216, the object's datapoints are detected, mapped, and added to the signal representing itself in the next frame 216. If a datapoint continuously appears in numerous frames, the value stored for the power of that datapoint would grow to infinity. Therefore, before data are added into the next frame 216 (i.e., before step 516) the power value for each datapoint is attenuated. In a preferred embodiment, the attenuation is by a factor of 2.

As a result, for a datapoint that appears in numerous frames, the values stored for the power of that datapoint will not reach infinity but will instead will grow toward a maximum value depending on the factor of attenuation.

As a result of the attenuation, a datapoint may need to appear in several frames before it registers as part of an object. As a result, noise is filtered from the system. This is because false objects that may appear in only one or two frames will eventually be attenuated out of the data set. Also, as a result of the attenuation, if an object (or part of an object) is dropped out of one or two frames for some reason, the impact over time is minimal.

The mapping of datapoints according to the invention can be limited to only those bins within a defined search area. This minimizes the amount of processor time and storage space required to track objects 102. In one embodiment, the mapping and blob coloring is performed only for a limited search area which is a subset of the entire frame. In this embodiment, the search area of the old frame maps into the search area of the new frame. Therefore, a point in the old frame may be eliminated either by lying outside the search area in the old frame or by mapping into a cell that lies outside the search area of the new frame. This greatly reduces the computational effort required.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. An autonomous mining system, comprising:

at least one mining truck having a sensor, wherein said sensor is configured to detect objects within a field of view;

means for sampling each detector at a sample time to generate a current frame of datapoints, wherein each datapoint represents an object detected by said detector;

means for converting said datapoints into datapoints represented in global coordinates;

means for mapping said converted datapoints into a next frame of datapoints generated at a next sample time to create a new frame of datapoints, wherein said new frame of datapoints represents objects detected in said next frame as well as objects detected in one or more previous frames;

means for blob coloring said new frame of datapoints to define objects;

means for making list of said defined objects; and wherein said means for blob coloring comprises:

means for scanning said new frame to locate a bin having datapoint having a non-zero power value;

means for labeling said located bin with a new label where said located bin is not adjacent to a previously-labeled bin; and means for labeling said located bin with the same label as was assigned to said previously-labeled bin where said located bin is adjacent to said previously-labeled bin.

2. The system according to claim 1, further comprising means for combining said power value of each said located bin having the same label.

3. The system according to claim 2, further comprising counter means for counting the number of bins having a given label.

4. The system according to claim 3, further comprising means for combining all of said bins having first and second labels where said located bin is adjacent to a previously located bin having a first label and a previously located bin having a second label.

5. A system according to claim 1, wherein said means for generating comprises:

means for receiving from the sensor a time and amplitude signal for each object;

means for performing a fast-fourier transform on each said time and amplitude signal to generate a datapoint on each object;

means for comparing each datapoint to a threshold value;

means for discarding datapoints below said threshold value; and means for generating a frame of datapoints using said datapoints not discarded.

6. A system according to claim 1, further comprising means for determining a threshold value for said datapoint, wherein said means for determining said threshold value comprises:

means for selecting a datapoint to be thresholded;

means for determining a value of other datapoints in proximity to said selected datapoints; and means for averaging said value of said adjacent datapoints to determine said threshold.

7. A system according to claim 6, wherein said means for determining a value of other datapoints comprises means for determining a value for each of eight datapoints immediately adjacent to said datapoint.

8. A system according to claim 1, further comprising means for creating an array of objects using said new from of datapoints.

9. A system according to claims 1, further comprising means for attenuating a power value of said converted datapoints.

10. A system according to claim 1, wherein said means for mapping said converted datapoints into a next frame of datapoints further comprises means for converting said converted datapoints into a frame of reference of said sensor at said next sample time so that objects detected in one or more previous frames are correlated with objects in said next frame.

11. A host mobile machine having a system for tracking objects detected in the path of the host mobile machine, comprising:

a sensor mounted on said host mobile machine and configured to detect objects within a field of view and to generate a frame of datapoints, wherein said datapoints represent the position relative to said sensor of one or more objects detected by said sensor; and a detection processing system coupled to said sensor, wherein said detection processing system comprises a processor configured to convert said datapoints into datapoints represented in global coordinates and map said converted datapoints into a next frame of datapoints to create a new frame of datapoints;

wherein said new frame of datapoints represents objects detected in said next frame as well as objects detected in one or more previous frames, said new frame of datapoints indicative of the position of said objects relative to said sensor.

12. The mobile machine according to claim 11, further comprising a digital signal processor configured to receive said frame of datapoints from said sensor, to convert said datapoints into a power vs. range representation, and to threshold said received datapoints.

13. The mobile machine according to claim 11, wherein said detection processing system comprises:

means for blob coloring said new frame of datapoints to define objects; and means for making a list of said defined objects.

14. A mobile machine having a tracking system for tracking objects detected in the path of the mobile machine comprising:

a sensor mounted on said mobile machine and configured to detect objects with a field of view and to generate a frame of datapoints, wherein said datapoints represent the position relative to said sensor of one or more objects detected by said sensor; and a detection processing system coupled to said sensor, wherein said detection processing system comprises a processor configured to convert said datapoints into datapoints represented in global coordinates and map said converted datapoints into a next frame of datapoints to create a new frame of datapoints, means for blob coloring said new frame of datapoints to define objects, and means for making a list of said defined objects; and;

a digital signal processor configured to receive said frame of datapoints from said sensor, to convert said datapoints into a power vs. range representation, and to threshold said received datapoints;

wherein said new frame of datapoints represents objects detected in said next frame as well as objects detected in one or more previous frames; and wherein said means for blob coloring comprises:

means for scanning said new frame to located a bin having a datapoints having a non-zero power value;

means for labeling said located bin with a new label where said located bin is not adjacent to a previously labeled bin; and means for labeling said located bin with the same label as was assigned to said previously-labeled bin where said located bin is adjacent to said previously labeled bin.

15. The mobile machine according to claim 14, further comprising means for combining said power value of each said located bin having the same label.

16. The mobile machine according to claim 15, further comprising counter means for counting the number of bins having a given label.

17. The mobile machine according to claim 14, further comprising means for combining all of said bins having first and second labels where said located bin is adjacent to a previously located bin having a first label and a previously located bin having a second label.

18. The mobile machine according to claim 14, wherein said means for generating comprises:

means for receiving from the detector a time and amplitude signal for each object;

means for performing a fast-fourier transform on each said time and amplitude signal to generate a datapoint for each object;

means for comparing each datapoint to a threshold value;

means for discarding datapoints below said threshold value; and means for generating a frame of datapoints using said datapoints not discarded.

19. The mobile machine system according to claim 18, further comprising means for determining a threshold value for said datapoint, wherein said means for determining said threshold value comprises:

means for selecting a datapoint to be thresholded;

means for determining a value of other datapoints in proximity to said selected datapoint; and means for averaging said value of said adjacent datapoints to determine said threshold.

20. The mobile machine according to claim 19, wherein said means for determining a value of other datapoints comprises means for determining a value for each of eight datapoints immediately adjacent to said datapoint.

21. The mobile machine according to claim 14, further comprising means for creating an array of objects using said new frame of datapoints.

22. The mobile machine according to claim 14, further comprising means for attenuating a power value of said converted datapoints.

23. The mobile machine according to claim 14, wherein said means for mapping said converted datapoints into a next frame of datapoints further comprises means for converting said converted datapoints into a frame of reference of said detector at said next sample time so that objects detected in one or more previous frames are correlated with objects in said next frame.

* * * * *